Jan. 22, 1963 N. M. LOURIE 3,075,175

CHECK NUMBER GENERATING CIRCUITRY FOR INFORMATION HANDLING APPARATUS

Filed Nov. 24, 1958

INVENTOR.
NORMAN M. LOURIE

BY Henry L. Hanson

ATTORNEY

United States Patent Office 3,075,175
Patented Jan. 22, 1963

3,075,175
CHECK NUMBER GENERATING CIRCUITRY FOR INFORMATION HANDLING APPARATUS

Norman M. Lourie, Newton Centre, Mass., assignor to Minneapolis-Honeywell Regulator Company, Minneapolis, Minn., a corporation of Delaware Filed Nov. 24, 1958, Ser. No. 776,126
6 Claims. (Cl. 340—146.1)

A general object of the present invention is to provide a new and improved information handling apparatus particularly adapted for an apparatus of the type associated with error detection and error correction schemes. More specifically, the present invention is concerned with a new and improved apparatus and manner of manipulating digital data for use in an error detecting and correcting scheme wherein the number of channels required for the detection and correction data is not changed from the number of data processing channels needed without such detection and correction data.

It has been found desirable in certain types of data processing configurations to provide means whereby it is possible to detect when an error has occurred in a data manipulation. A representative form of error detection involves appending to an informational group, a satellite or check number which is representative of the data making up the informational group. In its basic form, the satellite or check number may comprise a single bit representative of the number of ones and zeros in digitally coded information. This single bit is sometimes referred to as the "odd-even" check, or the parity bit check. A more sophisticated checking scheme involves the weighting of the bits for an information transfer, and generating therefrom a multi-bit weight count which is transferred along with the information and which is examined at certain stages in the data manipulation with respect to the data being manipulated to check the accuracy of the manipulation. Both the partiy and weight count systems of error detection are disclosed in the patent issued to R. M. Bloch, entitled "Diagnostic Information-Monitoring System," Reissue 24,447, March 25, 1958. By providing check digits on information in two directions, it is possible to not only provide for error detection in the data manipulated, but it is also possible to provide for error correction. Such an error detection and correction scheme is disclosed in a copending application of Richard M. Bloch entitled "Information Handling Apparatus," Serial Number 702,668, filed December 13, 1957, now Patent No. 2, 977,047. In the last mentioned Bloch application, the data may be considered with respect to certain information channels with certain check numbers being appended in each channel to the information therein and an additional check or restoration number being provided in a cross channel dimension and located in a further channel which is in effect in parallel with the information channels.

In accordance with the principles of the present invention, the provision of a multi-dimensional check and correction data is provided for information being handled without the necessity of increasing the total number of channels of information being handled. This arrangement has been achieved without materially weakening the ability of the system to detect errors and also correct errors.

It is therefore a more specific object of the present invention to provide a new and improved apparatus for manipulating informational data and providing therefor multidimensional check and restoration bits which are handled in the same channels in which the information is handled.

In accordance with the principles of the present invention, the data being manipulated may be considered as being handled in terms of a series of frames, each frame of which may comprise a plurality of input informational bits. In one form, these informational bits are adapted to be transferred by a parallel transfer. For checking and restoration purposes, a parity bit is generated from the informational bits of each frame. After a series of frames have been transferred or manipulated, and the parity bits generated therefor, the entire series of frames is then followed by a frame which is formed from the parity bits generated from the frames which have been transferred or manipulated. After one or more groups of information frames and their parity bits have been transferred, it may be desired to provide a further check signal which may be appended to the entire information group. Inasmuch as the parity bits are generated in accordance with the content of each frame, the final check number will preferably be generated by the data bits in each of the channels associated with each frame. This latter check number is sometimes referred to as a longitudinal check or as a long check, inasmuch as the terminology is frequently referenced to the way in which the data might well be recorded on magnetic tape or in some other storage medium. The parity bit may then be considered as a lateral check or a cross-check and may be utilized for error correction purposes.

A still further object of the present invention is to provide a new and improved apparatus for manipulating digital data in terms of frames of information wherein a cross parity bit is generated for each frame and a plurality of bits are then treated as a frame on the same channels on which the frame data bits are located.

Another more specific object of the invention is to provide with the foregoing object of an additional check number which is in the form of a channel check number which may be carried with the information along a cross check number generated for each frame.

The foregoing objects and features of novelty which characterize the invention as well as other objects of the invention are pointed out with particularity in the claims annexed to and forming a part of the present specification. For a better understanding of the invention, its advantages and specific objects attained with its use, reference should be had to the accompanying drawing and descriptive matter in which there is illustrated and described a preferred embodiment of the invention.

Figures 1, 2:
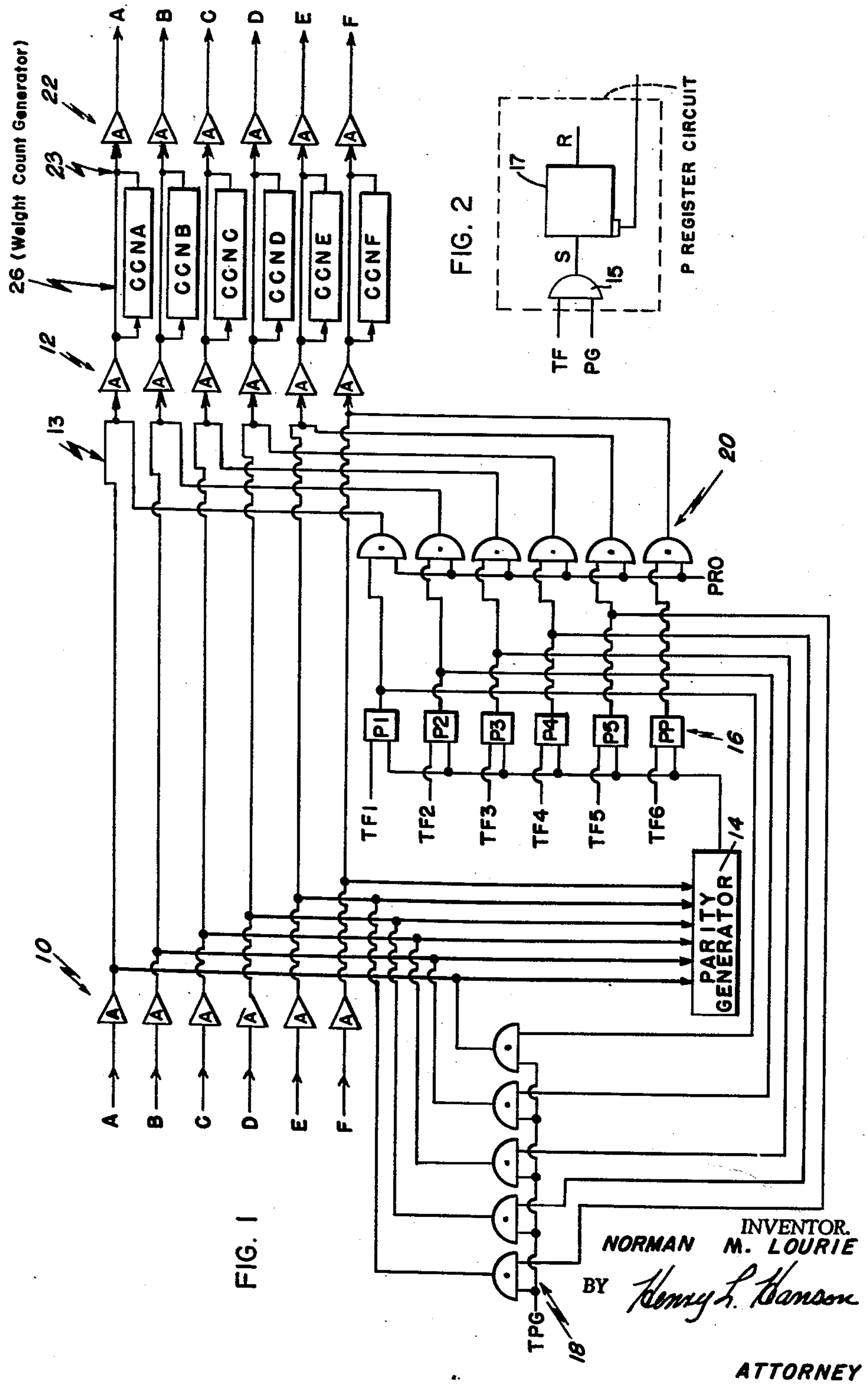
FIGURE 1 is a diagrammatic showing of the present invention.
FIGURE 2 is a detailed showing of a portion of a register used in the invention.

In the embodiment illustrated in FIGURE 1, there are assumed to be six information channels, A, B, C, D, E, and F, which are adapted to carry and transfer digital information in a data processing system. For purposes of the present invention, it is assumed that the transfer and manipulation is in the parallel mode with six bits of information being transferred at the same time on the channels A through F. Connected at the input ends of the channels A through F are a series of transfer amplifiers 10 which effect a transfer of any information bits received in the respective channels to a further set of transfer amplifiers 12 by way of input buffer or OR gate circuitry 13. Connected to the channels A through F is a parity generator circuit 14, the latter of which is adapted to produce a single parity bit in the event that there is a predetermined "odd-even" combination of bits on the information channels A through F. A representative type of parity generator will be found in the Spielberg Patent 2,674,727, issued April 6, 1954.

The output of the parity generator circuitry 14 is connected to a parity bit register 16 which includes six parity bits storage circuits P1 through P5 and PP. Frame timing signals TF are associated with the respective storage circuits and they are identified as TF1 through TF5 and TFP. Representative logical circuitry for each of the circuits making up the parity bit register 16 is shown in FIGURE 2. Here, the input signals TF and PG, the latter being the output of the parity generator 14, are connected to the input of an AND gate 15. The AND gate 15 is connected to the set input of a storage flip-flop 17 to store therein a predetermined parity bit if such is produced by the parity generator. The flip-flop 17 is adapted to be reset following the parity readout explained below.

The outputs of the parity register stages P1 through P5 are adapted to be gated through a transfer getting circuitry 18 to the parity generator circuit 14. The outputs of the parity register circuit 16 are also adapted to be gated through a series of output transfer gates 20 to the transfer amplifier circuits 12 for each of the six channels A through F. The outputs of the transfer amplifiers 12 are adapted to be passed through a further set of transfer amplifiers 22 by way of input buffer or OR gate circuitry 23. Operating with the respective channels between the amplifiers 12 and 22 are a series of channel check number generating circuits CCNA through CCNF, corresponding to the channels A through F, the latter of which are also adapted to be coupled to the amplifier by way of the OR gate circuitry 23.

Before considering the operation of the circuitry illustrated in the figure, the arrangement of the data transferred through the circuits should be considered. There is here listed in the following table a preferred arrangement of data for a six-channel transfer circuit. The channels A through F are so identified by the code letters in the table, while the frames transferred are identified by the decimal number indication. The bit designations P1 through P15 identify the parity bits for the frames 1 through 15. The bit PP1–5 identifies the parity bit for the parity bits P1 through P5. The bit PP6–10 identifies the parity bit for the parity bits P6 through P10. Similarly, the bit PP11–15 identifies the parity bit for the parity bits P11 through P15.

Appended at the end of the table are the channel check numbers CA1 through CA6 for the channel A, CB1 through CB6 for the channel B, CC1 through CC6 for the channel C, CD1 through CD6 for the channel D, CE1 through CE6 for channel E, and CF1 through CF6 for channel F.

*Table I*

| Channels | | | | | | |
|---|---|---|---|---|---|---|
| A1 | B1 | C1 | D1 | E1 | F1 | Frames |
| A2 | B2 | C2 | D2 | E2 | F2 | |
| A3 | B3 | C3 | D3 | E3 | F3 | |
| A4 | B4 | C4 | D4 | E4 | F4 | |
| A5 | B5 | C5 | D5 | E5 | F5 | |
| P1 | P2 | P3 | P4 | P5 | PP1–5 | |
| A6 | B6 | C6 | D6 | E6 | F6 | |
| A7 | B7 | C7 | D7 | E7 | F7 | |
| A8 | B8 | C8 | D8 | E8 | F8 | |
| A9 | B9 | C9 | D9 | E9 | F9 | |
| A10 | B10 | C10 | D10 | E10 | F10 | |
| P6 | P7 | P8 | P9 | P10 | PP6–10 | |
| A11 | B11 | C11 | D11 | E11 | F11 | |
| A12 | B12 | C12 | D12 | E12 | F12 | |
| A13 | B13 | C13 | D13 | E13 | F13 | |
| A14 | B14 | C14 | D14 | E14 | F14 | |
| A15 | B15 | C15 | D15 | E15 | F15 | |
| P11 | P12 | P13 | P14 | P15 | PP11–15 | |
| CA1 | CB1 | CC1 | CD1 | CE1 | CF1 | |
| CA2 | CB2 | CC2 | CD2 | CE2 | CF2 | |
| CA3 | CB3 | CC3 | CD3 | CE3 | CF3 | |
| CA4 | CB4 | CC4 | CD4 | CE4 | CF4 | |
| CA5 | CB5 | CC5 | CD5 | CE5 | CF5 | |
| CA6 | CB6 | CC6 | CD6 | CE6 | CF6 | |

The way in which the bits are arranged in the foregoing table may be considered analogous to the manner in which the bits might well be arranged for recording on a tape, whether a magnetic tape or some other type of storage device. The data would normally be manipulated in a parallel manner so that the first frame will be recorded on the tape in a bit configuration in accordance with the particular data to be recorded. This will be followed by frame number 2 and so on, until the first five frames have been transferred and recorded. The frame immediately following will be a parity bit frame which will include the parity bits P1 through P5 for each of the frames 1 through 5 and an additional parity bit for the parity bits P1 through P5. This method of arrangement will continue with the frames coming in until the end of a particular block of information. As illustrated, there are fifteen informational frames and three parity frames. At the end of the block there is illustrated six channel check frames, the bits in each channel comprising the check number for the corresponding channel.

Referring back to the single figure, considering the operation of the system, let us first assume that there are six channels of information adapted to be transferred a frame at a time between the transfer amplifier circuits 10 and 12. When the first frame is transferred, the bit combination will be applied to the parity generator circuit 14. Depending upon whether there were an odd or even number of bits of the "one" or "zero" type in the frame, the parity generator will have an output which is either a "one" or a "zero. The timing signal TF1 representing the timing of the first frame will be effective to gate the register circuit P1 to receive the parity bit from the parity generator 14. As the next frame is received and transferred between 10 and 12, the parity generator 14 will sense the bits thereof again to produce a second parity bit in accordance with the type of informational bits present in the six transfer channels. In this case, the timing signal for the second frame TF2 will act on the second parity storage register circuit P2 and the output of the parity generator will be stored in the circuit P2. The third, fourth, and fifth frames in the sequence will be treated in like manner, and the associated parity bits will be written into the parity register storage circuits P3, P4, and P5.

After the parity bits of the first five frames have been produce and stored in the parity register 16, the outputs of the first five storage circuits of the register P1 through P5 will be read by way of the transfer parity gates 18 into the parity generator circuit 14. The purpose of this particular transfer is to generate a parity bit for the parity bits 1 through 5. The output of the parity generator circuit in this case will be gated into the parity storage circuit PP. As soon as this last mentioned parity bit has been generated, the output of the parity register circuit 16 will be transferred by way of the parity readout gates 20 into the transfer amplifiers 12.

In the case of the transfer of information as illustrated above in Table I, three individual frame groups of five frames each will be transferred along with the parity bits associated therewith. As the bits in each channel are being transferred between the transfer amplifiers 12 and 22, the channel check number generating circuits CCNA through CCNF will be operative to generate a weighted count from these bits by a predetermined summing scheme, such as suggested in the above mentioned Block reissue patent or by a function generating scheme as taught by the disclosure in a copending application of Roy W. Reach entitled "Check Number Generator," Serial Number 776,-125, filed November 24, 1958. The number from the channel check number generating circuits, after the eighteen frames have been transferred, may be appropriately transferred out in the respective channels and appended thereto in the manner illustrated in Table I.

When the data is taken from a storage record after it has been recorded in the manner illustrated in Table I, appropriate checks may be made in the manner taught by the above mentioned Bloh reissue patent to determine whether or not errors have occurred. The longitudinal check or channel check numbers at the end of the eighteen frame block may be used to indicate if there is an error in that particular channel. If an error is detected in any one such channel, the utilization circuitry may be programmed to reconstruct or to correct the information which is in error in the manner taught by the above subject Bloch application. Inasmuch as the parity bits for the frames are in the same channels as the information, it is necessary in such a programmed correction to first insure that the parity bits, or cross-channel reconstruction bits, are in proper form. This is achieved by utilizing the parity bit for the parity bits. Thus, if there is an error in channel A, and if the parity bit P1 is in error, as indicated by the parity bit PP1–5 indicating such error, the state of the parity bit P1 will be reversed in its state by the utilization circuit and then the parity bits P1 through P5 may be used in the normal reconstruction circuitry for restoring the data in channel A to its correct form. Obviously, if there is an error in any of the other parity bit positions, the parity check bit may be used to reconstruct the corresponding channel parity bit so that the related parity bits may be utilized in reconstructing the channel in error.

It will be apparent from the foregoing description that there has been provided an improved apparatus for creating and arranging check digits for a multiple channel data handling circuit with the multiple dimension check digits which are related to the data being carried in the same channels as the information. The principles of the invention may well be applied to a data processing system having any number of channels. Consequently, the manipulating scheme may be considered with respect to $n$ channels wherein the parity bits for the frames transferred will be appearing in the $n$th frame position, and a parity bit for the parity bits will be generated so that there are $n$ parity bits carried in the parity bit frame. In other words, the parity bits appear after $n$—1 frames have been transferred, and since there will be $n-1$ parity bits for those frames, the $n$th parity bit will be the parity bit for the parity bits.

While, in accordance with the provisions of the statutes, there has been illustrated and described the best forms of the invention known, it will be apparent to those skilled in the art that changes may be made in the apparatus described without departing from the spirit of the invention as set forth in the appended claims and that in some cases, certain features of the invention may be used to advantage, without a corresponding use of other features.

Having now described the invention, what is claimed as new and novel and for which it is desired to secure by Letters Patent is:

1. Data manipulating apparatus comprising a multiple channel data transfer circuit adapted to transfer a plurality of data bits simultaneously, a parity bit generator circuit connected to said transfer circuit to produce a parity bit for the plurality of data bits of each data transfer, storage means for each of said parity bits generated for each data transfer, and means connecting said storage means to said data transfer circuit to transfer said storage parity bits for each data transfer simultaneously to the multiple channels of said transfer circuit.

2. Data manipulating apparatus comprising a multiple channel data transfer circuit adapted to transfer a plurality of data bits simultaneously, a parity bit generator circuit connected to said transfer circuit to produce a parity bit for the plurality of data bits of each data transfer, means generating a parity bit for the parity bits generated from the transferred data, storage means for all of said parity bits, and means connecting said storage means to said data transfer circuit to transfer simultaneously all of said stored parity bits to the multiple channels of said transfer circuit.

3. A data handling apparatus comprising circuit means for effecting a parallel transfer of data, said circuit means having a plurality of transfer lines, a parity generating circuit connected to said circuit means to generate a parity bit for each parallel data transfer, a storage register connected to said parity generator, said register having a separate storage position for each parity bit generated from each parallel data transfer, and means connecting said register to said transfer lines to effect a parallel transfer of said parity bits thereto.

4. A data handling apparatus comprising circuit means for effecting a parallel transfer of data, said circuit means having a plurality of transfer lines, a parity generating circuit connected to said circuit means to generate a parity bit for each parallel data transfer, a storage register connected to said parity generator, said register having a separate storage position for each parity bit generated from each parallel data transfer, means connecting said register to said parity generating circuit to generate a parity bit for the parity bits, and means connecting said register to said transfer lines to effect a parallel transfer of said parity bits thereto.

5. A data processing apparatus comprising an $n$ channel data transfer circuit adapted to transfer in parallel $n$ bits of data in an $n$ bit frame, signal generating means connected to said transfer circuit to generate a parity bit for each frame transferred, means connected to said last named generating means to sense $n-1$ parity bits and produce therefrom a parity bit for the parity bits, and means connecting the output of said generating means to said transfer circuit so that $n$ parity bits may be simultaneously transferred thereto.

6. A data processing apparatus comprising an $n$ channel data transfer circuit adapted to transfer in parallel bits of data in an $n$ bit frame, signal generating means connected to said transfer circuit to generate a parity bit for each frame transferred, means connected to said last named generating means to sense $n-1$ parity bits and produce therefrom a parity bit for the parity bits, means connecting the output of said generating means to said transfer circuit so that $n$ parity bits may be transferred simultaneously thereto, and signal generating means connected to each channel to generate a check data number for the data transferred in each channel.

References Cited in the file of this patent

UNITED STATES PATENTS

| | | |
|---|---|---|
| 2,689,950 | Bayliss et al. | Sept. 21, 1954 |
| 2,719,959 | Hobbs | Oct. 4, 1955 |
| 2,897,480 | Kumagai | July 28, 1959 |
| 2,904,781 | Katz | Sept. 15, 1959 |

OTHER REFERENCES

Richards, R. K.: Arithmetic Operations in Digital Computers, D. Van Nostrand Co., Inc., Princeton, N.J., 1955.